Figure 1:
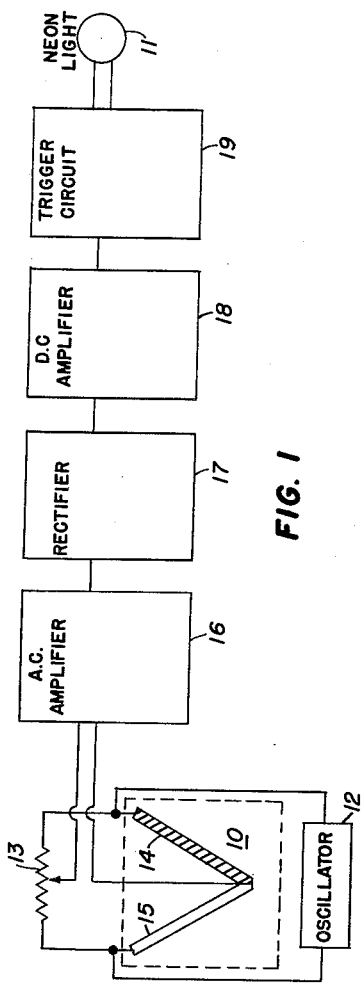

July 31, 1962

G. A. MARSH ET AL 3,047,847

DEVICE FOR REMOTELY INDICATING CORROSION

Filed Dec. 12, 1958

INVENTORS.
GLENN A. MARSH
BY LYNN E. ELLISON
EDWARD SCHASCHL

Edward Schaschl
ATTORNEY

United States Patent Office 3,047,847
Patented July 31, 1962

3,047,847
DEVICE FOR REMOTELY INDICATING CORROSION
Glenn A. Marsh, Lynn E. Ellison, and Edward Schaschl, Crystal Lake, Ill., assignors to The Pure Oil Company, Chicago, Ill., a corporation of Ohio
Filed Dec. 12, 1958, Ser. No. 779,973
2 Claims. (Cl. 340—235)

This invention relates to an apparatus which automatically determines the existence and extent of corrosion and transmits this information by visual means, or otherwise, to locations remote from the place where the corrosion occurs.

Corrosion is a continuing industrial problem which annually costs industries large sums of money. The problem is constantly under surveillance. A number of techniques have been devised to detect, measure, and record the existence and extent of corrosion, but in certain applications a conventional corrosion meter is inconvenient to use. For example, in oil fields where it is desired to run a corrosion survey on a number of widely-spaced oil wells, the engineer must make a number of trips to each well when using conventional equipment. First he must install the probes or sensing devices and then he must visit each well every time a meter reading is to be obtained. This is troublesome and time-consuming. Furthermore, unless these visits are made regularly, information concerning the corrosion at any given well will not be up-to-date; hence, a rapid change in corrosion conditions may go unnoticed for a considerable length of time. A partial solution of the problem may be had by the use of separate corrosion meters and recording instruments at each well or probe location, but the labor involved in gathering the information is great, and up-to-date information on rapidly changing conditions cannot be had. A similar problem exists in refineries and chemical plants where it is inconvenient to climb to probe locations on high towers or pipes to take readings. It is also difficult and time-consuming to gather corrosion information on long pipelines, or to make surveys of soil corrosivity along a pipeline where the probes are installed in the pipe or in the soil at spaced intervals.

It is, of course, desirable that any great or rapid change in the conditions of corrosion should be brought to the attention of the engineer at once. The prior art teaches various warning or alarm systems, which, by means of audible or visual devices, or both, inform the engineer whenever a drastic change in conditions has occurred. However, for purposes of corrosion detection, it is generally insufficient that the engineer be apprised that a change has occurred. It is further necessary that he be apprised of the extent or degree of change.

Because of their accuracy and flexibility in making resistance measurements by means of comparison methods, resistance bridges are incorporated in the sensing elements of some instruments. These instruments function as analogue computers to indicate qualitatively changes in physical characteristics which cannot be conveniently made by other expedients. One application of such a bridge is in corrosion studies where a corrosion-testing unit, or probe, comprising a pair of serially-connected, metallic, strip-like elements which form one resistance branch of a Wheatstone bridge, is exposed to a corrosive environment. Because the magnitude of the changes in resistance in a corrosion-measuring probe of this nature is small, it is necessary to employ a bridge-measuring network which is sufficiently sensitive to permit their measurement. Furthermore, the diversity of installation locations which are necessary in investigating or studying the corrosion rate of extended systems, such as pipelines, petroleum refining process equipment, or oil fields, requires a bridge-measurement apparatus which is easily carried, rugged, and safe to use in hazardous locations where the use of explosion-proof equipment is required.

Accordingly, it is an object of this invention to provide a wholly automatic apparatus which permits the rapid and direct determination of the extent of corrosion of a metallic material of construction.

It is a further object of this invention to provide an apparatus adapted to detect rapid changes in the extent of corrosion and transmit a signal proportional to such corrosion to a remote location.

It is still another object of this invention to provide a highly sensitive, self-contained, Wheatstone bridge, measuring circuit for detecting and measuring small changes in resistance resulting from the dimensional change due to the corrosion of a metallic specimen comprising a resistance element in the Wheatstone bridge.

It is another object of this invention to provide a Wheatstone-bridge measuring device for use in connection with temperature-compensating corrosion-test probes comprising a pair of serially-connected metallic elements forming one resistance branch of a Wheatstone bridge.

Figure 2:
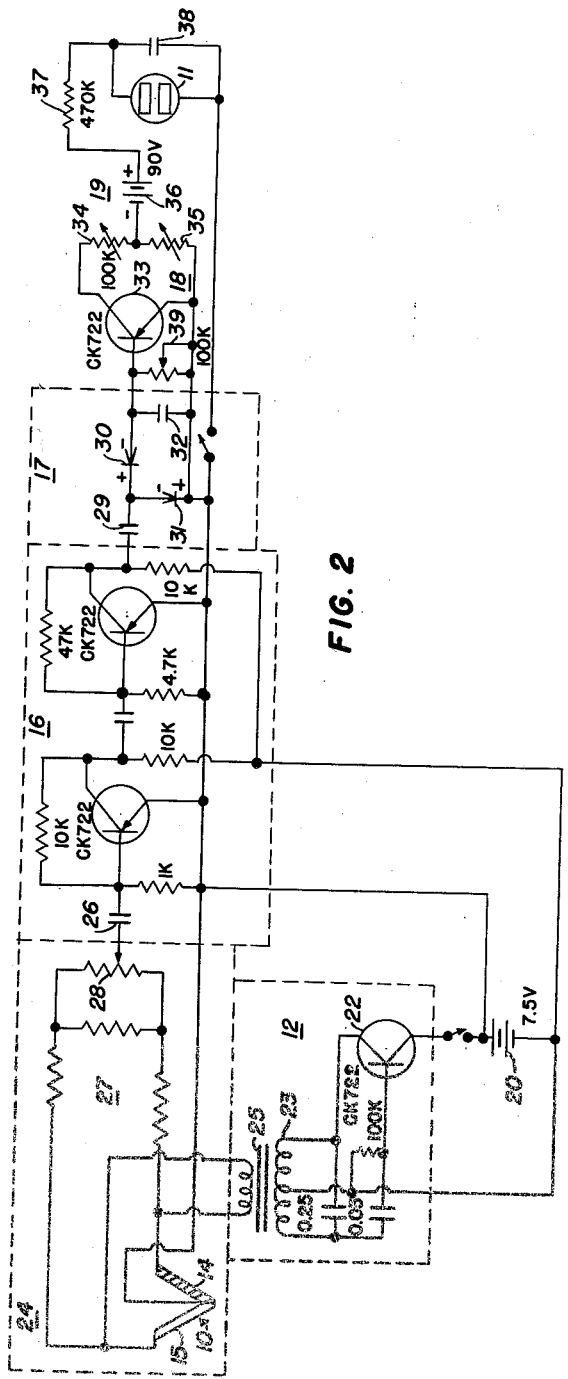

These and other objects will become apparent from the detailed description of this invention and the accompanying drawing of which, FIGURE 1 is a block diagram showing the various component circuits which cooperate to form the sensing, measuring, amplifying, and signalling network of this invention, and FIGURE 2 is a schematic diagram of the network showing the various circuit components employed in a preferred embodiment.

Briefly, this invention comprises a device similar to a conventional corrosion meter but modified in certain respects. Information gathered at the test probe is fed to the various electronic circuits of this device which in turn operate a neon light which at the start of the test is off. After a predetermined amount of corrosion has occurred, the neon light begins to flash momentarily, and as the corrosion proceeds, the rate of flashing increases in proportion to the amount of corrosion which has occurred.

In using this invention, the test probe 10 is installed in the corrosion environment to be tested and is connected to the circuit of FIGURE 1. A neon light 11 is run out on a wire to a high point where it will be visible from a central elevated location. This type of installation is repeated at all the probe locations. From a preselected central location from which all the lights are visible, there is observed: (1) the elapsed time since the installation of each probe, (2) whether the corresponding light is flashing, and (3) the frequency at which the light may be flashing. If two or more lights are in the same general area, they may be of different colors, blue, violet, red, etc., for easy identification. Thus, in a few minutes one can gather the data on corrosion of a number of geographically, widely-spaced probes.

Basically, the apparatus of this invention consists of the circuits shown in block diagram form in FIGURE 1. An alternating current is supplied by the oscillator 12 to bridge circuit-branch 13 and test probe 10. Test probe 10 consists of two metal elements or coupons, 14 and 15. Only one of these elements (15) is exposed to the corrosive influences of the surrounding media in which it is immersed, the other element (14) being covered with a thin coating of non-corrosive resin. As corrosion occurs, the resistance of element 15 is increased and the bridge network comprising 14, 15 and 13 becomes unbalanced. The unbalanced bridge circuit produces an alternating current signal which is fed to amplifier 16. This amplified alternating-current signal is converted into direct current in rectifier 17. The resulting current is amplified in direct-current amplifier 18, and the amplified direct-current signal is fed to trigger circuit 19. Trigger circuit 19 contains a relatively high voltage power source, e.g., 90 volts, and a condenser which, when discharged, causes neon lamp 11 to glow. Thus, the resistive unbalance resulting from corrosion of the unprotected probe element is related to an electrical impulse which is amplified by two stages of amplifiers. When the bridge circuit is balanced before corrosion starts, there is no alternating-current input to the A.C. amplifier and thus no direct current present in the rectifier circuit. The trigger circuit then has a high value of resistance which substantially prevents the charging of the condenser, and thus there is no flashing of neon light 11. However, when corrosion causes unbalance and direct current is applied to the trigger circuit, the resistance in the trigger circuit decreases until it finally reaches a point where the voltage across the condenser and the neon lamp equals the firing voltage of the neon lamp. When the current flows through the lamp, the condenser becomes discharged and the voltage across the lamp drops until the lamp becomes extinguished. Then a new charge is built up in the condenser. The rate of flashing, therefore, is proportional to the degree of unbalance of the bridge circuit. This unbalance in turn is proportional to the amount of metal corroded from the unprotected probe element. Thus, the rate of flashing of light 11 is proportional to the amount of corrosion which has occurred, since the installation of the test probe. A number of alternative, equally efficient circuits would be obvious to a person skilled in electronics, given a basic concept of causing a neon light to flash at a frequency dependent upon the amount of corrosion in a test probe, but all of the enumerated elements would be necessary.

In the preferred embodiment, the circuit consists of transistor elements, but circuits employing vacuum tubes could also be used. If this were done, it would be possible to utilize the vacuum-tube voltage of amplifier 18 to cause a small motor to run, the speed of the motor depending upon the voltage generated. The motor could drive a rotating disc with one sector removed and a light bulb behind this disc could be so placed that a flashing light would become visible every time the open segment passed the bulb. Since the speed of the motor and of the disc would be proportional to the amount of corrosion at the test probe, so would the frequency with which the light would become visible. Alternatively, the motor might rotate a beacon or beamed light. In some cases it might be desirable to cause a horn or other audible signal device to sound in conjunction with the flashing of the light. This is easily accomplished by using a horn and rotary switch in conjunction with the beacon, or a sensitive relay placed in series with each neon light could be used to complete a circuit causing the horn to sound.

A preferred embodiment of this invention is illustrated in detail in FIGURE 2. Referring to the drawing, it will be seen that the apparatus of this invention consists of power source provided by suitable electric batteries. This direct-current power is converted to a low-frequency alternating current by a suitable oscillator 12. Oscillator 12 consists essentially of a circuit comprising transistor 22 and transformer coil 23. This oscillator circuit is inductively coupled to bridge circuit 24 through transformer 25. The frequency of the oscillating signal is dependent principally on the inductance of primary winding 23 and capacitor 26. The output signal of the oscillator appears at the secondary winding of transformer 25 and is applied to bridge circuit 24, which includes corrosion-test probe 10 and resistor network 27. Corrosion-test probe 10, which functions as a sensing element, is preferably prepared by serially connecting a pair of metallic, foil-like coupons, 14 and 15, and mounting them on a suitable specimen holder, not shown.

Temperature compensation is effected by coating or ensheathing one of the coupons (14) with a protective material in order to insulate it from the corrosive environment to which the corrosion-testing probe is exposed. The resistance of unprotected coupon 15 will increase upon exposure of the probe to the corrosive conditions due to dimensional changes caused by the corrosion process. A preferred embodiment of a corrosion-test probe is described in detail by Schaschl, United States Patent 2,834,858.

It is to be understood that while this preferred embodiment is a corrosion-measuring device, the invention is equally applicable to the detecting and measuring of other physical properties. It could, for example, be used in conjunction with the detecting system of Cotton, United States Patent 2,583,930, to detect smoke and gases, or to detect temperature changes if elements 14 and 15 are made of suitable, dissimilar metals. In short, it is applicable to any means which relates a physical phenomenon with the magnitude of an alternating electrical impulse.

The second resistance branch 27 consists of a network of resistances designed to facilitate the calibration of the bridge and provides sufficient sensitivity to permit accurate corrosion-rate readings. Potentiometer 28 is included in the bridge circuit to balance the bridge at the start of the test so that there is initially no input to alternating current amplifier 16, and neon light 11 does not flash. Alternatively, potentiometer 28 may be adjusted initially below the null point, so as to give an input to amplifier 16, and cause neon light 11 to flash. As corrosion occurs, the frequency of flashing will decrease to zero when the bridge reaches the null point, and then again increases as continuing corrosion restores unbalance. In either case, as corrosion proceeds, the bridge circuit balance is changed, and a changing alternating current signal appears at potentiometer 27. This signal is transferred across condenser 26 to two-stage transistorized amplifier 16. The amplified signal is fed through capacitance 29 to rectifier circuit 17, wherein it is converted to a direct-current signal. Rectifier circuit 17 consists of copper oxide rectifiers 30 and 31 together with filter capacitor 32. The output of rectifier circuit 17 is fed to D.C. amplifier 18 where it is amplified. The output of D.C. amplifier 18 is feed in turn to trigger circuit 19. When no signal is being fed to D.C. amplifier-transistor 33 through condenser 29 and rectifier circuit 17, that is, when the bridge circuit is not emitting a signal, the trigger circuit consisting of variable resistances 34 and 35, battery 36, resistor 37, and capacitor 38 at a very high resistance. When no current is flowing through D.C. amplifier-transistor 33, the resistance of the collector circuit is so large that current cannot flow from battery 36 to condenser 38 in any substantial amount. However, when D.C. amplifier-transistor 33 conducts current, this current flows through resistors 35 and 37 and condenser 38.

Resistors 34 and 35 are adjustable to permit compensation for variations in circuit values. The current flowing in this trigger circuit associated with transistor 33 charges condenser 38 until the ignition voltage of neon lamp 11 is reached. At this point, the lamp flashes, discharging condenser 38 until the voltage across condenser 38 becomes insufficient to maintain ionization of the gas in the lamp. At this time the lamp again is extinguished. Capacitor 38 thereupon collects another charge until the lamp reaches ignition voltage and again flashes. It is apparent that the rate of flashing of neon lamp 11 depends upon the amount of current flowing through transistor 33 which in turn depends upon the intensity of the signal generated by bridge circuit 24. This in turn is dependent upon the amount of corrosion occurring at test probe 10. Potentiometer 39 controls the bias of direct-current amplifier-transistor 33. Assuming the bridge circuit is balanced at the beginning of a test, and potentiometer 39 is adjusted for a maximum resistance value, transistor 33 will conduct and cause the neon light to begin flashing as soon as a measurable amount of corrosion has occurred at test probe 10. In the alternative, potentiometer 39 may be adjusted so that the lamp will not start flashing until a predetermined amount of corrosion has occurred. Once flashing starts, the frequency of flashing is a further indication of the amount of corrosion or metal loss at test probe 10. The transistors used in this circuit are type CK 722. Batteries 20 and 36 have voltages 7.5 volts and 90 volts, respectively.

The subject of this invention is not limited to the circuits described above. A number of alternative, equally efficient circuits would be obvious to a person skilled in electronics, given a basic concept of causing the neon lamp to flash at a frequency dependent upon the amount of corrosion in a test probe. However, all of the enumerated electronic elements would be necessary. By the words "long distances" and "remotely located," the inventor must be understood to mean distances substantially greater than those over which the face of any ordinary meter can conveniently be read, extending up to and including even distances of miles.

What is claimed is:

1. A meter for signalling the change in impedance of an impedance-change sensing element comprising said sensing element, a second impedance connected in series therewith to form a first branch of a bridge circuit, a second bridge circuit branch including a variable impedance connected with said first branch to form a Wheatstone bridge circuit, alternating potential-source-means for energizing said bridge, an electrical circuit connected to the output of said bridge including means for amplifying an alternating signal, rectifying means, direct current amplifying means including an adjustable bias adapted to cut off the output of said direct current amplifier until the unbalance of said bridge circuit is sufficient to overcome said bias, and means responsive to the magnitude of the output of said direct current amplifier for producing intermittent sensible signals at frequencies proportional to the extent of resistance change of said sensing element, and detectable at a long distance from said element.

2. A device according to claim 1 in which the intermittent signal is a flashing light.

References Cited in the file of this patent

UNITED STATES PATENTS

| | | |
|---|---|---|
| 2,755,431 | Scherbatskoy | July 17, 1956 |
| 2,802,174 | Staunton | Aug. 6, 1957 |
| 2,824,283 | Ellison | Feb. 18, 1958 |
| 2,825,894 | Marmorstone | Mar. 4, 1958 |
| 2,881,056 | Joyner | Apr. 7, 1959 |